United States Patent
Klingauf et al.

(10) Patent No.: US 9,400,544 B2
(45) Date of Patent: Jul. 26, 2016

(54) ADVANCED FINE-GRAINED CACHE POWER MANAGEMENT

(71) Applicant: Apple Inc., Cupertino, CA (US)

(72) Inventors: Wolfgang H. Klingauf, San Jose, CA (US); Rong Zhang Hu, Saratoga, CA (US); Sukalpa Biswas, Fremont, CA (US); Shinye Shiu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 570 days.

(21) Appl. No.: 13/855,189

(22) Filed: Apr. 2, 2013

(65) Prior Publication Data

US 2014/0298058 A1    Oct. 2, 2014

(51) Int. Cl.
*G06F 1/32* (2006.01)

(52) U.S. Cl.
CPC ............ *G06F 1/3275* (2013.01); *G06F 1/3296* (2013.01); *Y02B 60/1225* (2013.01); *Y02B 60/1228* (2013.01); *Y02B 60/1285* (2013.01); *Y02B 60/32* (2013.01)

(58) Field of Classification Search
CPC . Y02B 60/1225; G06F 1/3275; G06F 1/3225; G06F 1/3287; G06F 2201/885; G06F 2212/502; G06F 2212/601
See application file for complete search history.

(56) References Cited

U.S. PATENT DOCUMENTS

| | | | |
|---|---|---|---|
| 5,512,921 A | 4/1996 | Mital et al. | |
| 5,715,426 A | 2/1998 | Takahashi et al. | |
| 5,761,715 A * | 6/1998 | Takahashi | G06F 1/3215 365/227 |
| 5,961,617 A | 10/1999 | Tsang | |
| 6,731,290 B2 | 5/2004 | Cui et al. | |
| 6,799,250 B2 | 9/2004 | Hamaya | |
| 6,848,024 B1 | 1/2005 | Rowlands et al. | |
| 6,944,714 B2 | 9/2005 | Lesarte et al. | |

(Continued)

FOREIGN PATENT DOCUMENTS

| | | |
|---|---|---|
| TW | I323842 B | 4/2010 |
| TW | 201033919 A | 9/2010 |
| TW | 201250695 A | 12/2012 |

OTHER PUBLICATIONS

Han et al.; "Using Checksum to Reduce Power Consumption of Display Systems for Low-Motion Content;" Proc. IEEE International Conference on Computer Design, Oct. 4-7, 2009, Lake Tahoe, CA; pp. 47-53.

(Continued)

*Primary Examiner* — Kim Huynh
*Assistant Examiner* — Brandon Kinsey
(74) *Attorney, Agent, or Firm* — Rory D. Rankin; Meyertons, Hood, Kivlin, Kowert & Goetzel, P.C.

(57) ABSTRACT

Methods and apparatuses for reducing leakage power in a system cache within a memory controller. The system cache is divided into multiple sections, and each section is supplied with power from one of two supply voltages. When a section is not being accessed, the voltage supplied to the section is reduced to a voltage sufficient for retention of data but not for access. The cache utilizes a maximum allowed active section policy to limit the number of sections that are active at any given time to reduce leakage power. Each section includes a corresponding idle timer and break-even timer. The idle timer keeps track of how long the section has been idle and the break-even timer is used to periodically wake the section up from retention mode to check if there is a pending request that targets the section.

20 Claims, 12 Drawing Sheets

(56) References Cited

U.S. PATENT DOCUMENTS

| | | | |
|---|---|---|---|
| 7,042,461 B2 | 5/2006 | Cui | |
| 7,043,647 B2 | 5/2006 | Hansen et al. | |
| 7,127,560 B2 | 10/2006 | Cohen et al. | |
| 7,152,187 B2 | 12/2006 | Tran et al. | |
| 7,430,642 B2 | 9/2008 | Moyer | |
| 7,437,513 B2 | 10/2008 | Saida et al. | |
| 7,472,302 B2 | 12/2008 | Hu et al. | |
| 7,502,887 B2 | 3/2009 | Tanaka et al. | |
| 7,636,812 B2 | 12/2009 | Kaneko | |
| 7,853,817 B2 | 12/2010 | Yarak | |
| 7,904,658 B2 | 3/2011 | Abadeer et al. | |
| 8,103,894 B2 | 1/2012 | Balakrishnan et al. | |
| 8,156,357 B2 | 4/2012 | Zhang et al. | |
| 8,285,936 B2 | 10/2012 | Roberts et al. | |
| 8,335,122 B2 | 12/2012 | Dreslinski, Jr. et al. | |
| 8,412,971 B2 | 4/2013 | Branover et al. | |
| 8,832,485 B2 | 9/2014 | Branover et al. | |
| 9,058,676 B2 | 6/2015 | Tripathi et al. | |
| 2002/0156978 A1 | 10/2002 | Hamaya | |
| 2003/0156472 A1 | 8/2003 | Satou et al. | |
| 2004/0024968 A1 | 2/2004 | Lesartre et al. | |
| 2004/0174369 A1 | 9/2004 | Cui | |
| 2004/0225842 A1 | 11/2004 | Rowlands et al. | |
| 2005/0086435 A1 | 4/2005 | Todoroki | |
| 2005/0246499 A1 | 11/2005 | Saida et al. | |
| 2006/0143382 A1 | 6/2006 | Damaraju et al. | |
| 2007/0043965 A1 | 2/2007 | Mandelblat et al. | |
| 2007/0124538 A1 | 5/2007 | Abadeer et al. | |
| 2007/0136530 A1 | 6/2007 | Tanaka | |
| 2007/0186057 A1 | 8/2007 | Moll et al. | |
| 2007/0288776 A1 | 12/2007 | DeMent et al. | |
| 2008/0040547 A1 | 2/2008 | Abadeer et al. | |
| 2008/0100636 A1 | 5/2008 | Lai et al. | |
| 2008/0143695 A1 | 6/2008 | Juenemann et al. | |
| 2008/0244181 A1 | 10/2008 | Walz et al. | |
| 2008/0313482 A1 | 12/2008 | Karlapalem et al. | |
| 2009/0119487 A1 | 5/2009 | Hosoda | |
| 2009/0235028 A1 | 9/2009 | Kaneko | |
| 2010/0122100 A1 | 5/2010 | Strumper | |
| 2010/0123727 A1 | 5/2010 | Kwa et al. | |
| 2010/0191990 A1 | 7/2010 | Zhang et al. | |
| 2010/0228637 A1 | 9/2010 | Ghosh et al. | |
| 2011/0153928 A1* | 6/2011 | Avudaiyappan | G06F 1/3275 711/109 |
| 2011/0199377 A1 | 8/2011 | Jang et al. | |
| 2011/0208916 A1 | 8/2011 | Saito | |
| 2011/0238919 A1 | 9/2011 | Gibson et al. | |
| 2011/0252251 A1* | 10/2011 | de Cesare | G06F 1/3203 713/320 |
| 2011/0283124 A1 | 11/2011 | Branover et al. | |
| 2012/0159074 A1 | 6/2012 | Sodhi et al. | |
| 2012/0188262 A1 | 7/2012 | Rabii | |
| 2012/0303897 A1 | 11/2012 | Pullagoundapatti et al. | |
| 2012/0314833 A1 | 12/2012 | Venkatasubramanian et al. | |
| 2012/0324145 A1 | 12/2012 | Teo | |
| 2013/0036270 A1 | 2/2013 | Dreslinski et al. | |
| 2013/0080813 A1 | 3/2013 | Tarui et al. | |
| 2013/0111121 A1 | 5/2013 | Ananthakrishnan et al. | |
| 2013/0246818 A1 | 9/2013 | Nomura et al. | |
| 2014/0052922 A1 | 2/2014 | Moyer et al. | |
| 2014/0089590 A1 | 3/2014 | Biswas et al. | |
| 2014/0173207 A1* | 6/2014 | Wang | G06F 12/0811 711/122 |
| 2014/0181407 A1 | 6/2014 | Crum et al. | |
| 2014/0181410 A1 | 6/2014 | Kalamatianos et al. | |

OTHER PUBLICATIONS

U.S. Appl. No. 13/850,548, filed Mar. 26, 2013, entitled "Compressed Frame Writeback and Read for Display in Idle Screen on Case," inventors Brijesh Tripathi, Peter Holland, and Albert Kuo.

U.S. Appl. No. 13/890,306, filed May 9, 2013, entitled "Memory Power Savings in Idle Display Case," inventors Sukalpa Biswas, Shinye Shiu, Cyril de la Cropte de Chanterac, Manu Gulati, Pulkit Desai, and Rang Zhang Hu.

U.S. Appl. No. 13/850,565, filed Mar. 26, 2013, entitled "Mechanism to Detect Idle Screen On," inventors Brijesh Tripathi, Peter Holland, and Albert Kuo.

Ke Meng and Russ Joseph, "Process Variation Aware Cache Leakage Management", Oct. 4-6, 2006, Proceedings of the 2006 International Symposium on Low Power Electronics and Design (ISLPED '06) ACM, New York, NY, USA; pp. 262-267.

Albonesi, D.H., "Selective Cache Ways: On-Demand Cache Resource Allocation", May 2000, Journal of Instruction-Level Parallelism 2 (2000) 1-6; pp. 1-22.

U.S. Appl. No. 13/866,282, filed Apr. 19, 2013, entitled "A Cache Allocation Scheme Optimized for Browsing Applications," inventor Sukalpa Biswas, Wolfgang H. Klingauf, Rong Zhang Hu, and Shinye Shiu.

U.S. Appl. No. 13/855,174, filed Apr. 2, 2013, entitled "Advanced Course-Grained Cache Power Management," inventors Shinye Shiu, Sukalpa Biswas, Wolfgang H. Klingauf, and Rong Zhang Hu.

U.S. Appl. No. 13/629,563, filed Sep. 27, 2012, entitled "System Cache with Coarse Grain Power Management," inventors Sukalpa Biswas, Shinye Shiu, and Rong Zhang Hu.

Non-Final Office Action in U.S. Appl. No. 13/890,306, mailed May 6, 2015, 9 pages.

Final Office Action in U.S. Appl. No. 13/866,282, mailed Jul. 17, 2015, 18 pages.

Office Action in Taiwan Patent Application No. 103113581, mailed May 19, 2015, 15 pages.

International Search Report and Written Opinion from PCT/US2014/031699, mailed Aug. 4, 2014, Apple Inc., pp. 1-12.

Flautner, et al., "Drowsy Caches: Simple Techniques for Reducing Leakage Power", ISCA '02 Proceedings of the 29th Annual International Symposium on Computer Architecture, May 25, 2002, pp. 148-157, IEEE Computer Society, Washington, DC, USA.

International Search Report and Written Opinion from PCT/US2014/032811, mailed Jun. 30, 2014, Apple Inc., pp. 1-8.

Non-Final Office Action in U.S. Appl. No. 13/629,563, mailed Sep. 17, 2014, 18 pages.

Final Office Action in U.S. Appl. No. 13/629,563, mailed Mar. 25, 2015, 16 pages.

Non-Final Office Action in U.S. Appl. No. 13/866,282, mailed Jan. 7, 2015, 13 pages.

Notice of Allowance in U.S. Appl. No. 13/855,174, mailed Nov. 7, 2014, 11 pages.

Office Action in Taiwan Patent Application No. 103113581, mailed Aug. 28, 2015, 17 pages.

Office Action in Taiwan Patent Application No. 103114566, mailed Sep. 23, 2015, 6 pages.

Non-Final Office Action in U.S. Appl. No. 13/850,548, mailed Apr. 7, 2015, 10 pages.

Non-Final Office Action in U.S. Appl. No. 13/850,565, mailed Nov. 28, 2014, 13 pages.

* cited by examiner

ADVANCED FINE-GRAINED CACHE POWER MANAGEMENT

BACKGROUND

1. Field of the Invention

The present invention relates generally to data caches, and in particular to methods and mechanisms for reducing leakage power in a system cache located in a memory controller.

2. Description of the Related Art

Integrated circuits (ICs) are often designed with the goal of minimizing power consumption. The total power consumed by an IC includes both dynamic power and leakage power. Leakage power refers to the power consumed by a device or circuit while not in use. Within an IC, a significant amount of leakage power may be lost by static random-access memory (SRAM) devices. While SRAM is a type of semiconductor memory that does not need to be refreshed like dynamic random-access memory (DRAM), SRAM is volatile since data will be lost when the SRAM is not powered. SRAM devices may include a large portion of the total area of a typical IC, and the leakage power lost by the SRAM devices may constitute a significant percentage of the overall power consumption of the IC.

SUMMARY

Systems, memory controllers, caches, and methods for reducing leakage power in a system cache are disclosed.

In one embodiment, to reduce the leakage power of the system cache, the system cache may be divided into multiple sections and the power supplied to each section may be controlled independently of the other sections. The system cache may supply some sections with a lower supply voltage to keep the sections in retention mode, which allows the sections to retain its data but not process requests. The system cache may supply other sections with a higher supply voltage to keep these sections in active mode. In one embodiment, the system cache may limit the number of sections in active mode to a maximum number of allowable sections. This may help limit the amount of leakage power consumed by the system cache by keeping most of the sections in retention mode.

In one embodiment, each section of the system cache may have a corresponding idle timer and a corresponding break-even timer. For a given section, the idle timer may be started when the section is in active mode and the idle timer may be reset to zero and restarted anytime the section processes a request. When the idle timer expires, the section may be put into retention mode. When the section enters retention mode, then the corresponding break-even timer may be started. When the break-even timer expires, the system cache may check to see if there are any pending requests to the section. If there are one or more pending requests to the section, then the section may be put into active mode in order to process the requests. If there are no pending requests that target the section, then the section may stay in retention mode, and the break-even timer may be restarted.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
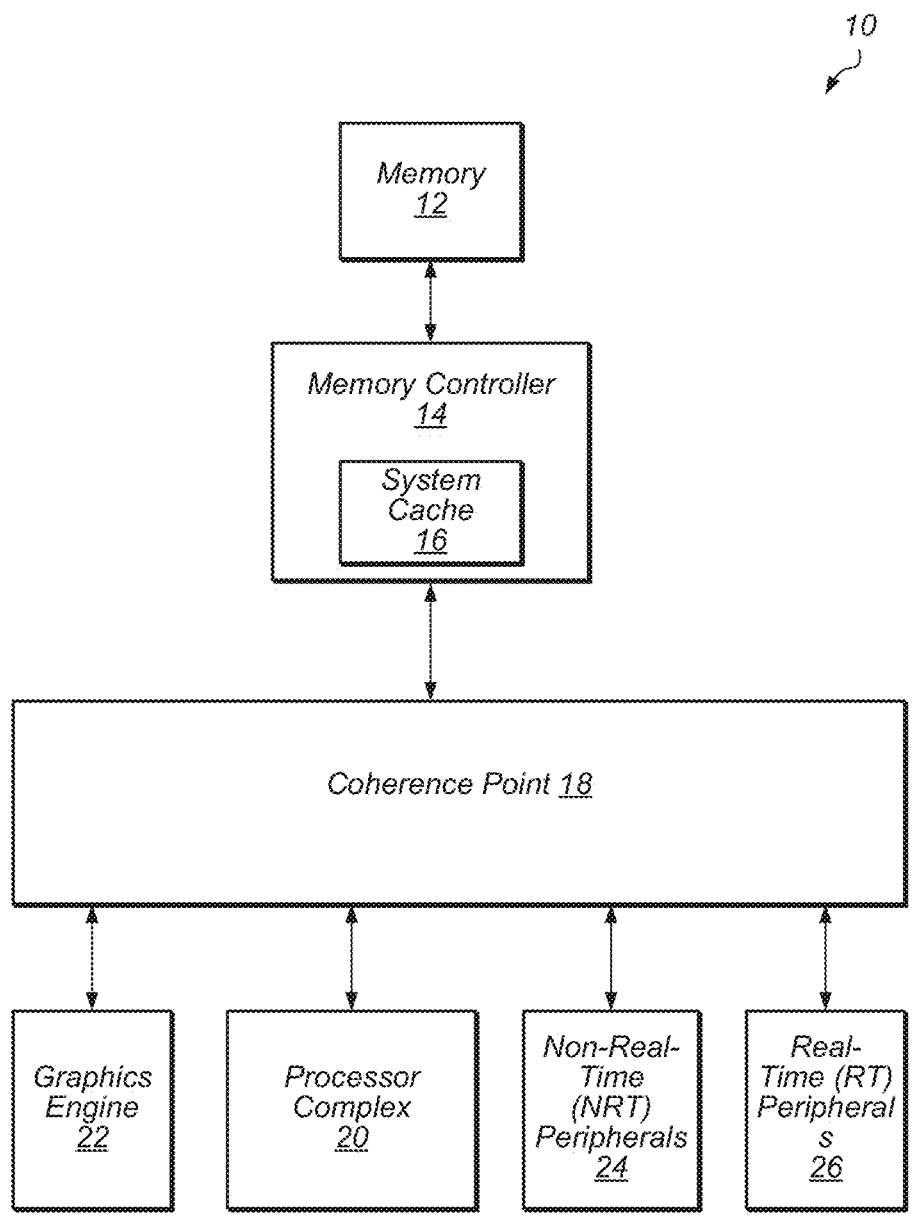
FIG. 1 illustrates one embodiment of a portion of an electronic device.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an electronic device is shown. In the illustrated embodiment, electronic device 10 includes a memory 12, memory controller 14, coherence point 18, processor complex 20, graphics engine 22, non real-time (NRT) peripherals 24, and real-time (RT) peripherals 26. It is noted that electronic device 10 may also include other components not shown in FIG. 1. Furthermore, in another embodiment, one or more of the components shown in FIG. 1 may be omitted from electronic device 10. In various embodiments, electronic device 10 may also be referred to as an apparatus, mobile device, or computing device.

Memory 12 is representative of any number and type of memory devices, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

Memory controller 14 may include circuitry configured to interface to memory 12, and various components may be coupled to memory controller 14 via coherence point 18. In other embodiments, one or more of the other devices shown in FIG. 1 may be coupled directly to memory controller 14 rather than coupled through coherence point 18. In various embodiments, memory controller 14 may include any number of ports for coupling to various peripherals, components, and/or requesting agents.

Memory controller 14 may include system cache 16 for storing data retrieved from or intended for memory 12. System cache 16 may be configured to process memory requests from multiple requesting agents. One or more requesting agents may be included within any of the devices shown connected to coherence point 18. In one embodiment, cache lines may be allocated in system cache 16 with either a sticky state or a non-sticky state. When deciding which data to retain in system cache 16, system cache 16 may base the decisions on the sticky status of the cache lines. As a result of using the sticky allocation for data that is going to be reused, the number of accesses that are made to memory 12 may be reduced, which reduces latency of memory requests and power consumption of electronic device 10.

Coherence point 18 may be configured to route coherent and non-coherent traffic to and from memory controller 14. Coherence point 18 may also be referred to as a coherence switch. Although not shown in FIG. 1, coherence point 18 may be coupled to other devices, such as a flash controller, camera, display, and other devices.

Processor complex 20 may include any number of central processing units (CPUs) (not shown) and various other components (e.g., caches, bus interface unit). The CPU(s) of processor complex 20 may include circuitry to run an operating system (OS). In various embodiments, the OS may be any type of OS (e.g., iOS). Each of the CPUs may include a level one (L1) cache (not shown), and each L1 cache may be coupled to a level two (L2) cache. Other embodiments may include additional levels of cache (e.g., level three (L3) cache).

Graphics engine 22 may include any type of graphics processing circuitry. Generally, the graphics engine 22 may be configured to render objects to be displayed into a frame buffer (not shown). Graphics engine 22 may include graphics processors that execute graphics software to perform a part or all of the graphics operation, and/or hardware acceleration of certain graphics operations. The amount of hardware acceleration and software implementation may vary from embodiment to embodiment. NRT peripherals 24 may include any non-real time peripherals. Various embodiments of the NRT peripherals 24 may include video encoders and decoders, scaler/rotator circuitry, image compression/decompression circuitry, etc. RT peripherals 26 may include any number and type of real-time peripherals.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
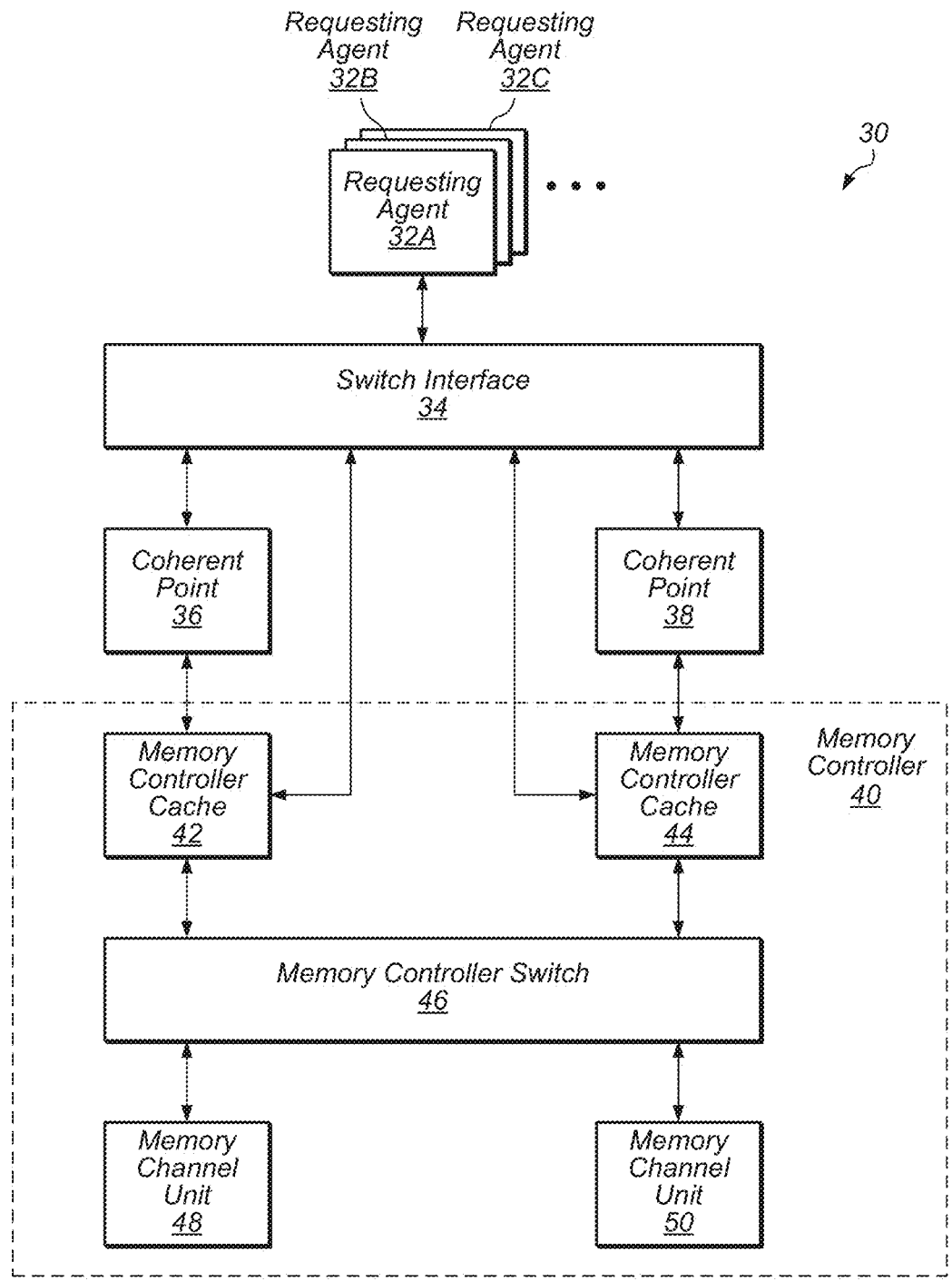
FIG. 2 illustrates one embodiment of a portion of an integrated circuit.

Turning now to FIG. 2, one embodiment of a portion of an integrated circuit is shown. Integrated circuit (IC) 30 may include requesting agents 32A-C, switch interface 34, coherence points 36 and 38, and memory controller 40. Memory controller 40 may include memory controller caches 42 and 44, memory channel switch 46, and memory channel units 48 and 50. Memory controller 40 may be coupled to one or more memory devices (not shown). In various embodiments, IC 30 may be included within any of various types of electronic devices, including mobile, battery-powered devices. IC 30 may also be referred to as a system on chip (SoC) or an apparatus. It is noted that IC 30 may include other components and interfaces not shown in FIG. 2.

The requesting agents 32A-C may be configured to perform various operations in the system, and may access memory as part of performing these operations. For example, requesting agents 32 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers). The requesting agents 32 may be physically separate circuitry, such as a separate instance of a processor. Alternatively, a requesting agent may be a logical entity such as a process or thread executing on a processor, such that a single physical processor may include multiple logical requestors. The number of requesting agents 32A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 32A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Coherence points 36 and 38 may be configured to manage the coherency of requests that are conveyed to the memory controller 40 from the requesting agents 32A-C. In one embodiment, traffic from requesting agents 32A-C may be split up in switch interface 34 and traverse a specific coherence point depending on the address that is being targeted by the specific memory request. Other embodiments may include other numbers of coherence points.

Memory controller caches 42 and 44 may be separate physical caches but may be considered a single logical memory controller cache. More specifically, memory controller caches 42 and 44 may share a single address space, and memory requests that reference the address space of cache 42 may be routed by switch interface 34 to cache 42 via coherence point 36 and memory requests that reference the address space of cache 44 may be routed by switch interface 34 to cache 44 via coherence point 38. Switch interface 34 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 42 and 44 may also be referred to as system caches. In other embodiments, memory controller 40 may include other numbers of memory controller caches. For example, in another embodiment, memory controller 40 may include four separate memory controller caches.

Memory controller caches 42 and 44 may be configured to maintain a sticky status for each cache line stored in the caches. The sticky status may be implemented via a sticky state, sticky flag, sticky bit, sticky tag, or other similar field. In one embodiment, a tag memory may be utilized to store tag entries that correspond to cache lines stored in a data memory. The tag entries may include multiple fields including a sticky status field and a group ID field. The group ID field may be used to identify the dataflow source of the request which caused the cache line to be allocated in the cache.

Memory controller switch 46 may route traffic between memory controller caches 42 and 44 and memory channel units 48 and 50. There may be one memory channel unit 48 and 50 for each memory channel included in a given embodiment, and other embodiments may include one channel or more than two channels. The memory channel units 48 and 50 may be configured to schedule memory operations to be transmitted on the memory channel. The memory channel units 48 and 50 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 48 and 50 may schedule memory operations in bursts of operations. To create bursts of memory operations for scheduling, the memory channel units 48 and 50 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Figure 3:
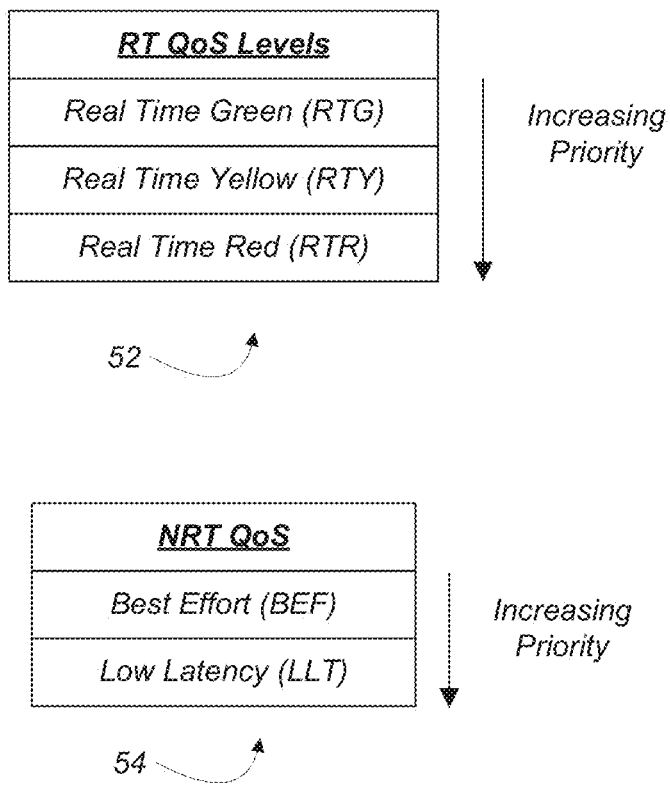
FIG. 3 illustrates two tables of definitions for two sets of QoS levels.

Referring now to FIG. 3, two tables are shown illustrating definitions of two sets of QoS levels for one embodiment. Other embodiments may include additional or substitute levels, and other embodiments may include additional levels in combination with a subset of the illustrated levels. As illustrated by the arrows pointing downward next to the tables 52 and 54 illustrates the QoS levels within a set in increasing priority. That is, the real time green (RTG) QoS level is the lowest priority RT QoS level, the real time yellow (RTY) QoS level is the medium priority RT QoS level, and the real time red (RTR) QoS level is the highest priority RT QoS level. A source may assign a QoS level to a given transaction based on the priority of the given transaction. Similarly, the best effort (BEF) QoS level is the lowest priority non-real-time (NRT) QoS level and the low latency (LLT) QoS level is the highest priority NRT QoS level.

The RTG, RTY, and RTR QoS levels may reflect relative levels of urgency from an RT source. That is, as the amount of time before data is needed by the RT source to prevent erroneous operation decreases, the QoS level assigned to each transaction increases to indicate the higher urgency. By treating transactions having higher urgency with higher priority, data may be returned to the RT source more quickly and may thus aid the correct operation of the RT source.

For example, a display pipe may initiate the reading of frame data from memory for the next frame to be displayed in the vertical blanking interval for the display. The frame is not actually displayed until the end of the vertical blanking interval, and thus the display pipe may use the RTG level during this time period. As the frame begins to be displayed (i.e. the display controller begins reading frame pixels from the display pipe output), the display pipe may raise the QoS level of frame data read operations to the memory to the RTY level. For example, if the amount of frame data that is read ahead of the current pixel being displayed reduces below a first threshold, the level may be raised to RTY. At a second threshold (lower than the first threshold), the display pipe may raise the QoS level of memory operations to RTR.

The BEF NRT QoS level may be a request to return the data as quickly as the memory controller is able, once the needs of other flows of data are met. On the other hand, the LLT NRT QoS level may be a request for low latency data. NRT memory operations having the LLT QoS level may be treated more closely, in terms of priority with other memory transactions, than those having the BEF QoS level (at least in some cases). In other cases, the BEF and LLT QoS levels may be treated the same by the memory controller.

It will be understood that the QoS levels shown in tables 52 and 54 of FIG. 3 are merely illustrative and should not be construed as implying any limitations upon the scope of the methods and mechanisms described herein. While the rest of this disclosure will be described in terms of transactions being assigned QoS levels from the tables 52 and 54 it is to be understood that other QoS levels may be employed in other embodiments. Other embodiments may implement other types of QoS schemes with more or fewer QoS levels. Furthermore, other embodiments may represent the different QoS levels with designators other than colors (for real-time) and best effort and low latency (for non-real-time).

Figure 4:
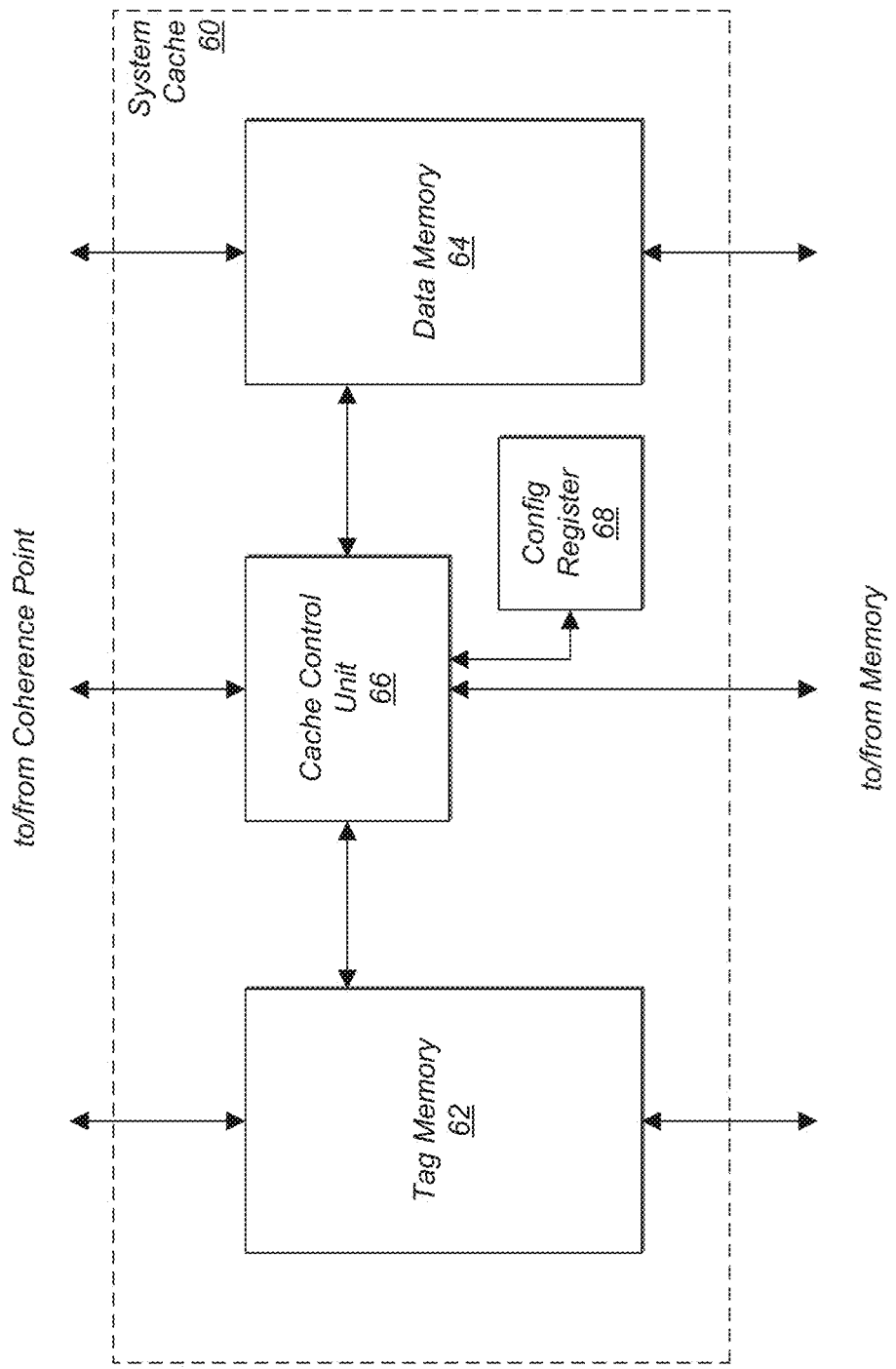
FIG. 4 is a block diagram illustrating one embodiment of a system cache.

Referring now to FIG. 4, a block diagram of one embodiment of a system cache is shown. In one embodiment, system cache 60 may include tag memory 62, data memory 64, cache control unit 66, and configuration register 68. It is noted that system cache 60 may also include other components and logic not shown in FIG. 4. For example, in other embodiments, system cache 60 may include arbitration circuitry to arbitrate among requests. It is to be understood that the system cache architecture shown in FIG. 4 is merely one possible architecture that may be implemented. In other embodiments, other system cache architectures may be utilized with the methods and mechanisms disclosed herein.

In one embodiment, tag memory 62 may be coupled to receive addresses for memory requests from requesting agents. It is noted that the terms "memory request" and "transaction" may be used interchangeably throughout this disclosure. Data memory 64 may be coupled to receive data or provide data for transactions. In various embodiments, tag memory 62 and data memory 64 may include multiple ways, and each way may be addressable by index. For example, in one embodiment, tag memory 62 and data memory 64 may each include 16 ways. In other embodiments, tag memory 62 and data memory 64 may include other numbers of ways. Cache control unit 66 is coupled to tag memory 62 and data memory 64, and cache control unit 66 may be configured to receive various control data related to the received transactions and to respond to the received control data. It is noted that although cache control unit 66 is shown in FIG. 4 as a single unit, in other embodiments, cache control unit 66 may be split up into multiple units within system cache 60. Configuration register 68 may include configuration information for the various group IDs associated with the data stored in system cache 60. Configuration register 68 may be programmed by software commands sent to cache control unit 66 from the OS and/or various requesting agents.

Configuration register 68 is representative of any number of configuration registers which may be utilized as part of system cache 60. For example, in one embodiment, there may be a separate configuration register 68 for each group identifier (ID) assigned by the OS to use system cache 60. In this embodiment, each configuration register may define a status, quota, and replacement policy for a respective group ID. The status may be set to either active or inactive by a software command sent to system cache 60. When the status is set to inactive, this may trigger the cache control unit 66 to invalidate all of the lines that are allocated for this particular group ID. The quota may be set to limit the amount of lines that may be allocated for the respective group ID in system cache 60.

Data memory 64 may comprise a set of data entries, each having capacity to store a cache line of data. The cache line may be the unit of allocation and deallocation in data memory 64. The cache line may be any desirable size, such as 32 bytes or 64 bytes, although larger and smaller cache line sizes may be supported in other embodiments. In another embodiment, the cache lines of data memory 64 may be referred to as "cache blocks".

In various embodiments, data memory 64 may utilize any type of memory device. In one embodiment, data memory 64 may comprise a RAM, for example, indexed by entry number. Data memory 64 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 66 (e.g., responsive to detecting a cache hit for a request, responsive to allocating the cache line storage location to store a missing cache line). Data may be read from the accessed cache line storage location to return to the requestor for a read cache hit, or to transmit to the memory for a cache line evicted from system cache 60. Data may be written to the accessed cache line storage location for a write cache hit from a requestor or to complete a cache fill of a missing cache line into an allocated cache line storage location. In some embodiments, data memory 64 may be a banked implementation and bank selection control may be provided from the cache control unit 66 as well.

Tag memory 62 may utilize any type of memory device, such as for instance, a RAM. Alternatively, tag memory 62 may comprise a content addressable memory (CAM) for snooping purposes, or a RAM/CAM combination. The tag memory 62 may comprise a plurality of tag entries, each entry selected by a different value of the index mentioned above. The selected tag entry may store the tags that correspond to the set of cache line storage locations in system cache 60 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information. In response to a request, the tag memory 62 may be configured to decode the index and output the tags to the cache control unit 66 for processing. In an embodiment, the tag memory 62 may also include tag comparison circuitry configured to compare the tags to the tag portion of the request address, and may provide the comparison results to the cache control unit 66. In another embodiment, the cache control unit 66 may compare the tags. The cache control unit 66 may also be configured to perform various tag updates by writing the tag entry.

System cache 60 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 62 and data memory 64) in system cache 60, at which the corresponding cache line would be stored. In one embodiment, system cache 60 may be associative, in which a given address maps to two or more cache line storage locations in the data memory 64 that may be eligible to store the cache line. System cache 60 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 64. The N cache line storage locations forming a set corresponding to a given index are often referred to as "ways". Other embodiments may be fully associative, in which any cache line storage location may be mapped to any address.

Cache control unit 66 may dynamically allocate a data entry in data memory 64 to store data for a transaction received by system cache 60. The transaction may be a write to memory, for example. The transaction may also be a read completion (with data) provided from the memory (not shown) in response to a read previously received from a requesting agent and targeting the memory.

In one embodiment, each transaction received by system cache 60 from a requesting agent may include a group ID number, a cache allocation hint, and one or more other attributes. The cache allocation hint may be utilized by system cache 60 and cache control unit 66 to determine how to allocate a cache line for the transaction if the transaction misses in the system cache 60. If a new cache line is allocated for the transaction, the group ID number may be stored in a corresponding entry in tag memory 62.

Tag memory 62 may be configured to store various tags for the cache lines cached in the system cache 60. For example, in one embodiment, the tags may include the coherence state, the sticky state, a dirty indicator, least recently used (LRU) data, a group identification (ID), and other data. Depending on the embodiment, some or all of these tags may be included in each entry of tag memory 62.

Figure 5:
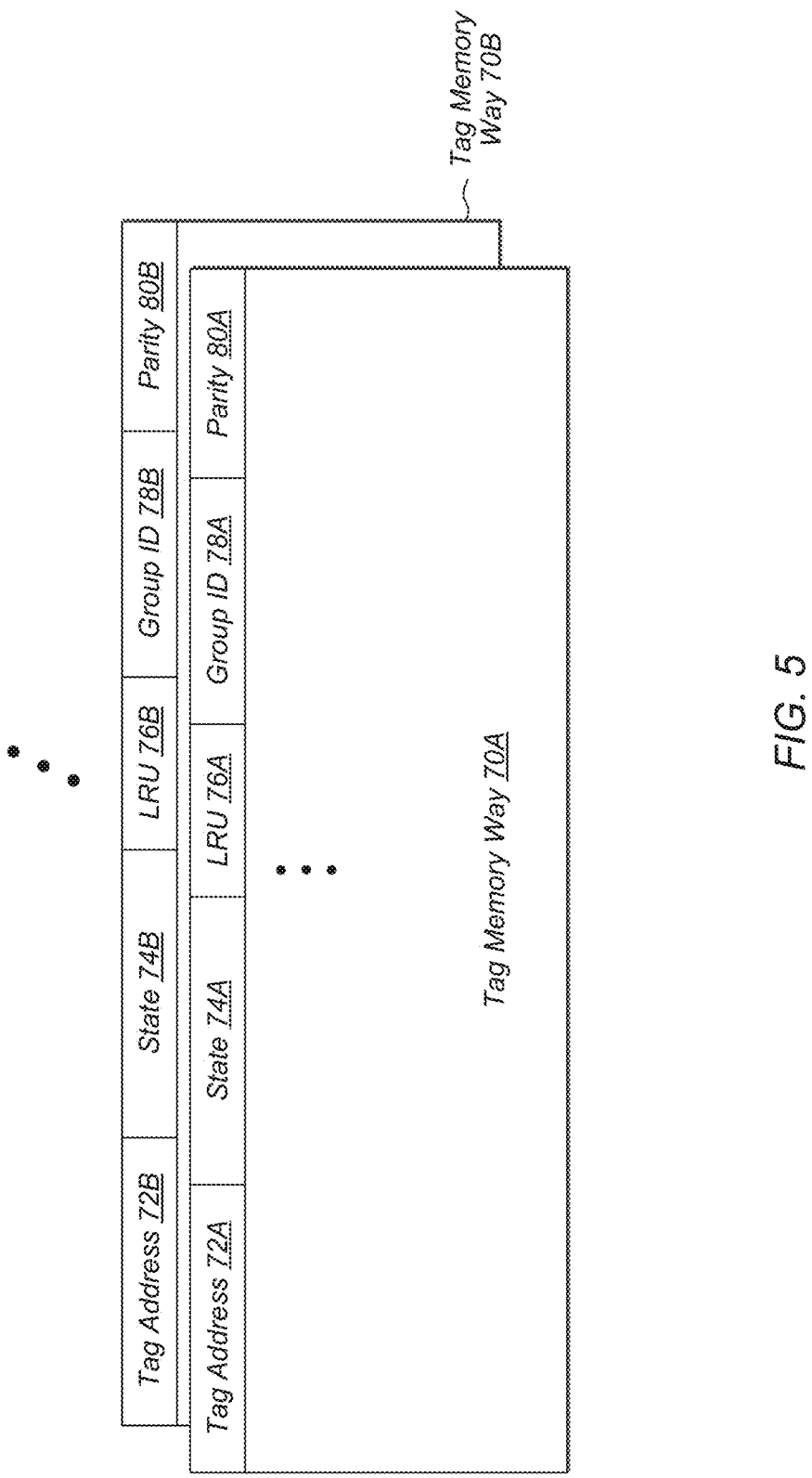
FIG. 5 is a block diagram illustrating one embodiment of a pair of tag memory ways.

Turning now to FIG. 5, a block diagram of one embodiment of a pair of tag memory ways is shown. Tag memory ways 70A-B are representative of any number of ways that may be included within a tag memory, such as tag memory 62 (of FIG. 4). In one embodiment, each tag memory way 70A-B may include any number of entries for data corresponding to cache lines stored in a corresponding data memory way. A sample entry is shown in each of tag memory ways 70A-B.

Each tag entry may include the tag portion of the address (tag address 72A-B), to be compared against input request addresses. Tag address 72A-B may include the most significant bits of the physical address field for a received transaction. The number of bits used for the tag address 72 field may vary depending on the embodiment. State 74A-B may represent the state of the corresponding cache line stored in the data memory. There may be multiple different values which the state 74A-B may take, depending on the embodiment. For example, in one embodiment, the different possible states may include the following: invalid, clean, dirty, data pending, sticky clean, sticky dirty, and LRU dirty. The requesting agent may also provide a hint as to the sticky status of the transaction. The data pending state may indicate that data for the cache line is currently being fetched from memory. Any entries with an invalid state may be chosen as the best candidates for replacement when a new line is allocated in the system cache. The next best candidates for replacement may be any entries with the LRU dirty state. It is noted that in another embodiment, each entry in tag memory ways 70A-B may include a sticky flag or sticky bit, and this may indicate if the entry is sticky, rather than the state field.

The requesting agent responsible for generating the transaction may convey a hint with the transaction that determines the state that will be assigned to the corresponding tag entry. This hint may determine if the data associated with the transaction is stored in the system cache. For example, in one scenario, for a specific transaction, the hint accompanying the transaction may indicate that the transaction is sticky. If the transaction is accompanied by a sticky hint, and the transaction misses in the system cache, then the data may be retrieved from memory and allocated in the system cache with a tag state 74 set to sticky. Setting the state to sticky indicates that this data will "stick" in the cache and will not be removed by the system cache. If data for another sticky transaction from a different group ID were attempting to allocate space in the system cache, this data would be prevented from replacing sticky lines from other group IDs.

The LRU 76A-B field may store a value indicating a usage status associated with the corresponding line. This LRU 76A-B field may indicate how recently and/or how often the corresponding line has been accessed, and the number of bits in this field may vary depending on the embodiment. The group ID 78A-B field may store a group ID identifying the group that owns the corresponding line in the data memory of the system cache. The group may refer to a specific dataflow that is being used by one or more requesting agents. It is noted that a "group ID" may also be referred to as a "dataset ID" in some embodiments. Depending on the embodiment, various numbers of bits may be utilized to represent the group ID.

In some cases, a single group ID may be shared by two or more requesting agents. For example, page translation tables may be utilized by multiple requesting agents, and any transactions referencing the page translation tables may be assigned a common group ID. This common group ID may span multiple requesting agents. Also, each requesting agent may use multiple separate group IDs for the different dataflows being utilized by the requesting agent. A group ID may be assigned to a dataflow for one or more requesting agents by the OS of the host electronic device. In one embodiment, a device driver may request a group ID from the OS. As part of the request, the device driver may identify which type of data the request corresponds to. Then, in response to receiving the request from the device driver, the OS may specify the group ID to be used for this request based on the type of data being accessed.

Each group represented by a group ID may be assigned a specific quota of cache lines in the system cache. When a group reaches the total amount of its quota, the group may not be able to allocate any more lines in the system cache. Instead, the specific group may replace its existing lines in the cache with the newly allocated lines. In one embodiment, the first lines that are replaced for a given group ID may be the lines which have an invalid state followed by the lines which have a LRU dirty state.

The parity 80A-B field may include any number of parity bits to provide an indication of the accuracy of the data in the entire entry across all of the fields. It is noted that in other embodiments, each entry of tag memory ways 70A-B may include one or more additional fields of information not shown in FIG. 4. For example, information about how recently the cache line was replaced may also be stored in each tag of tag memory ways 70A-B. Also, in other embodiments, tag memory ways 70A-B may be structured in any other suitable manner.

Figure 6:
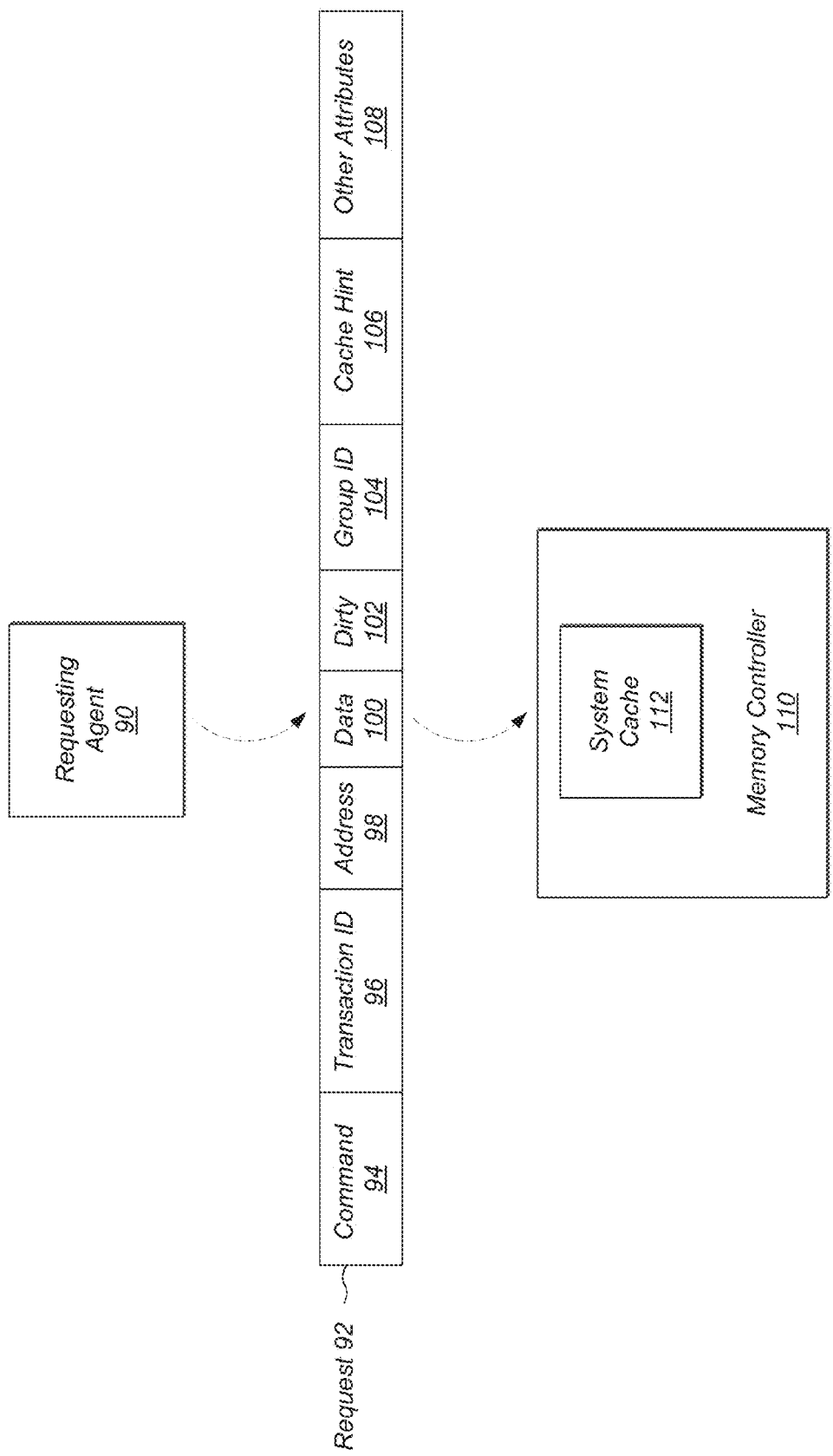
FIG. 6 illustrates one embodiment of a requesting agent conveying a request to a system cache.

Referring now to FIG. 6, one embodiment of a requesting agent conveying a request to a system cache is shown. Requesting agent 90 is representative of any number and type of requesting agents. Although requesting agent 90 is shown as sending request 92 directly to memory controller 110, it is noted that one or more components (e.g., coherence point, switch) may be located between requesting agent 90 and memory controller 110.

Each request sent from requesting agent 90 may include a plurality of fields. For example, in one embodiment, request 92 may include command 94, which indicates the type of request (e.g., read, write) being sent. Request 92 may also include transaction ID 96, which indicates the transaction ID associated with request 92. Transaction ID 96 may uniquely identify the request for requesting agent 90. It is noted that transaction ID 96 may also be referred to as a "request ID". In addition, in other embodiments, request 92 may also include an agent ID to identify the requesting agent. Request 92 may also include the address 98 and data 100 fields to identify the memory address and data (for a write request), respectively.

Request 92 may also include a dirty status indicator 102 to indicate if the write data is dirty. Request 92 may also include a group ID 104 to identify the group ID of request 92. Cache hint 106 may determine how request 92 is treated by system cache 112. In other embodiments, cache hint 106 may be referred to as an "allocation hint", "sticky hint", "sticky flag", "sticky bit", or "sticky attribute". It is noted that cache hint 106 may indicate the sticky status of request 92 and may also include other information regarding how request 92 should be treated by system cache 112. Other attributes 108 are representative of any number and type of additional attributes (e.g., coherency, QoS attribute, size of the request, requestor ID, speculative status) which may be part of request 92. It is noted that in other embodiments, request 92 may be structured differently, with one or more additional fields not shown in FIG. 6 and/or one or more of the fields shown omitted.

Although system cache 112 is shown as a single unit, it should be understood that in other embodiments, system cache 112 may be split up into two or more separate units. For example, in another embodiment, memory controller 110 may include two channels and system cache 112 may be split up into two separate physical system caches. In this embodiment, the two separate physical system caches may be managed as one logical system cache.

Figure 7:
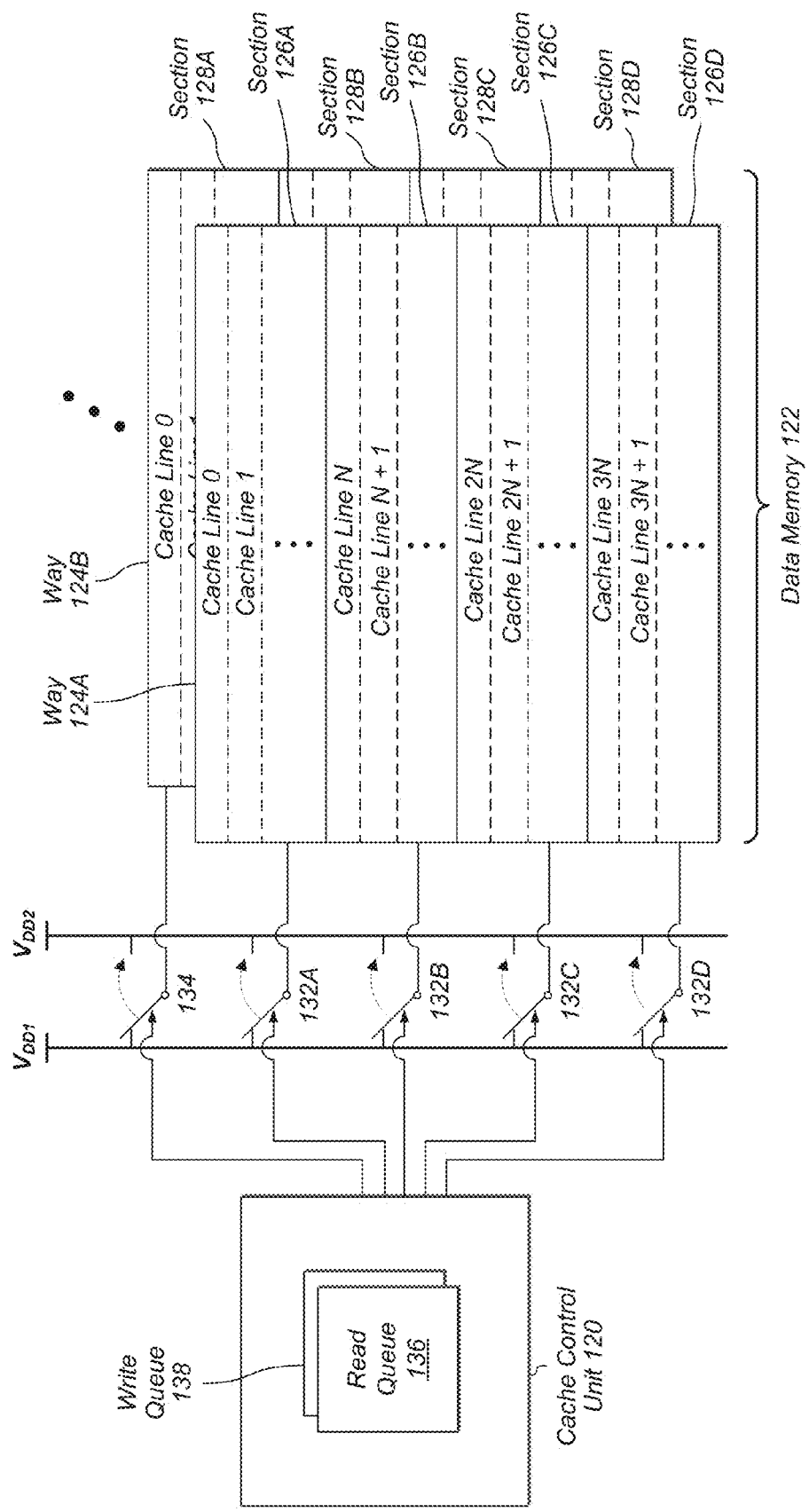
FIG. 7 is a block diagram illustrating one embodiment of a data memory divided into sections.

Turning now to FIG. 7, one embodiment of a system cache data memory divided into sections is shown. Data memory 122 includes ways 124A-B, which are representative of any number of ways of data memory 122. Each way 124A-B may be divided into four sections as shown in FIG. 7. Way 124A is divided into sections 126A-D and way 124B is divided into sections 128A-D. The number of cache lines 'N' per section may vary, depending on the embodiment. In other embodiments, each way may be divided into other numbers of sections. It is noted that a "section" may also be referred to as a "bank". In one embodiment, data memory 122 may be a static random-access memory (SRAM). In other embodiments, data memory 122 may be other types of memory.

Each section 126A-D and 128A-D may be coupled to two independent power supplies ($V_{DD1}$) and ($V_{DD2}$) via independently controllable switches. Switches 132A-D and switch 134A are shown in FIG. 7, and each of these switches may be controlled by cache control unit 120. The switches used to control the voltage supplied to sections 128B-D are not shown to avoid cluttering the figure. Although switches 132A-D and switch 134A are shown as analog switches, this is for illustrative purposes only. In other embodiments, switches 132A-D and switch 134A may be digital switches. For example, in another embodiment, cache control unit 120 may send a separate control code to each separate power supply to program the output voltage which is supplied to each section 126A-D and 128A-D of data memory 122. Other techniques for controlling and adjusting the voltage supplied to each section of data memory 122 are possible and are contemplated.

The voltage provided to each section may be determined by cache control unit 120 based on whether the specific section is being accessed or is on the verge of being accessed. If a section is being accessed, the voltage supplied to the section may be the higher supply voltage ($V_{DD1}$) which allows the data in the section to be read or written. If a section is not being accessed, the voltage supplied to the section may be the lower supply voltage ($V_{DD2}$) which allows the data in the section to be retained but does not allow data to be read from or written to the section. In one embodiment, for a specific type of system cache architecture, ($V_{DD1}$) may be 1.8 volts while ($V_{DD2}$) may be 1.3 volts. In other embodiments, the actual voltage of the two supply voltages ($V_{DD1}$) and ($V_{DD2}$) may vary.

By controlling each section independently, the leakage power lost by the overall system cache may be significantly reduced. When a given section is being accessed, the supply voltage ($V_{DD1}$) may be higher and so the leakage power may be greater during this time. However, when the given section is no longer being accessed, the supply voltage may be reduced to a retention voltage ($V_{DD2}$) to reduce the leakage power lost. After a period of time of inactivity, the given section may need to be accessed again, and in preparation for this, cache control unit 120 may switch the supply voltage to the higher voltage ($V_{DD1}$). Cache control unit 120 may allow for a grace period to elapse so that the given section has a chance to ramp-up to the higher supply voltage ($V_{DD1}$). Since the sections tend to be small, with the exact size of each section dependent on the embodiment, the ramp-up time should be short because the capacitive load of the section is relatively small. Generally speaking, the smaller the size of the section, the less the capacitive load which translates to a shorter ramp-up time.

Incoming read requests that hit or will be allocated in the system cache may be stored in read queue 136. Incoming write requests that hit or will be allocated in the system cache may be stored in write queue 138. Although queues 136 and 138 are shown as being located within cache control unit 120, in other embodiments, queues 136 and 138 may be located elsewhere in the overall system cache.

In one embodiment, cache control unit 120 may monitor the total number of pending requests stored in read queue 136 and write queue 138. This total number of pending requests may include all requests targeting active sections (i.e., sections with the higher supply voltage) as well as all requests targeting retention sections (i.e., sections with the lower supply voltage). If the total number of pending requests exceeds a software programmable threshold (e.g., 24), then cache control unit 120 may pick the oldest request from read queue 136 to process and then the oldest request from write queue 138 to process. If the oldest request in either queue targets a section in retention mode, then cache control unit 120 may take the targeted section out of retention mode and into active mode. If the number of active blocks is already at the maximum allowable number threshold, then cache control unit 120 may pick any active block that has no pending requests to put into retention mode to offset the targeted section being taken out of retention mode. This will ensure that the threshold number of blocks in active mode will not be exceeded. In one embodiment, cache control unit 120 may use a fixed search order based on way and logic section for selecting an active block to put into retention mode.

Figure 8:
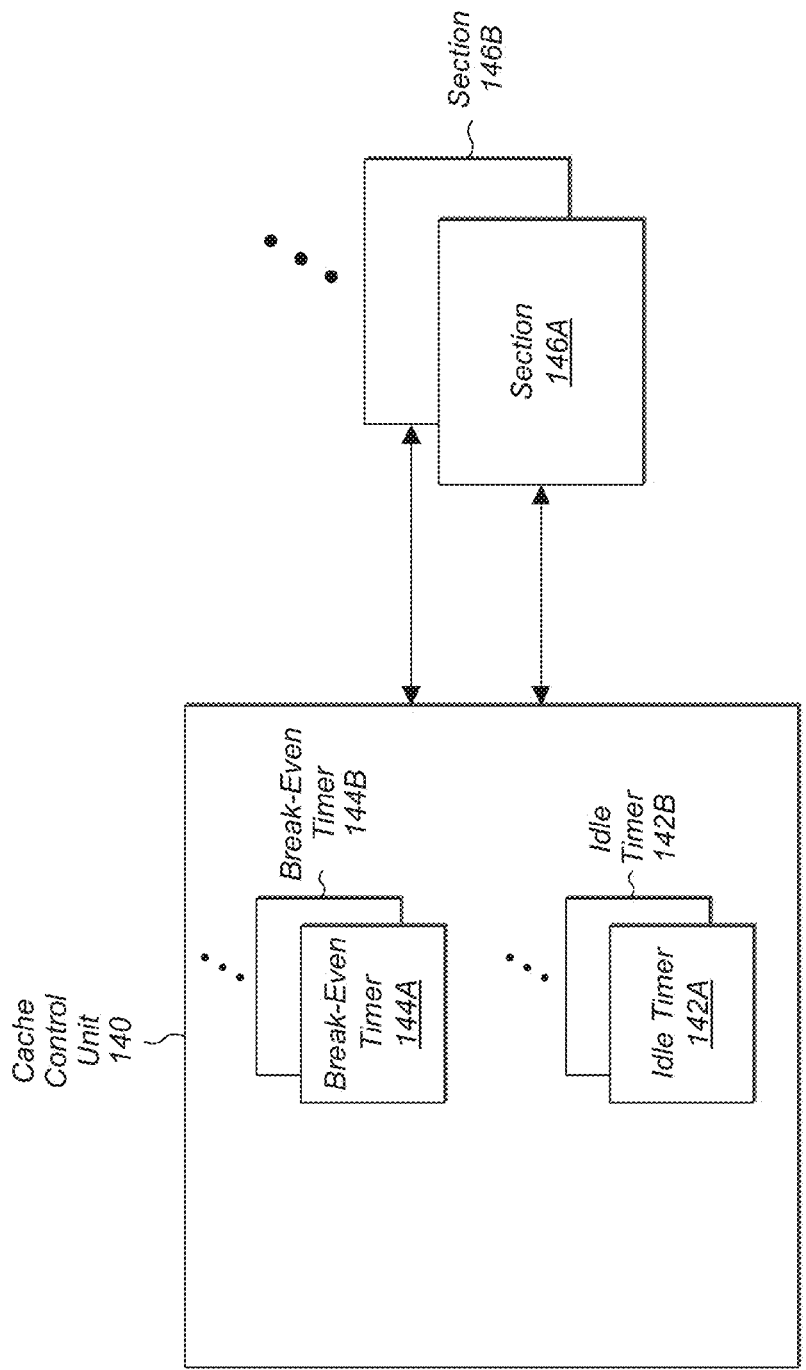
FIG. 8 is a block diagram illustrating one embodiment of the control logic per section of the system cache.

Referring now to FIG. 8, a block diagram of one embodiment of the control logic per section of a system cache is shown. Cache control unit 140 may include idle timers 142A and 142B and break-even timers 144A and 144B. Idle timers 142A-B are representative of any number of idle timers which may be employed within a system cache. In one embodiment, there may be an idle timer for each section of the system cache. Break-even timers 144A-B are representative of any number of break-even timers which may be employed within a system cache, and in one embodiment, there may be a break-even timer for each section of the system cache. Although idle timers 142A-B and break-even timers 144A-B are shown as being located within cache control unit 140, this is for illustrative purposes only. In other embodiments, idle timers 142A-B and break-even timers 144A-B may be located elsewhere within the system cache.

Sections 146A and 146B are representative of any number of sections of a system cache. Each of sections 146A-B may have a separately controllable supply voltage so that each section may be powered independently of the other sections. Some sections can be in retention mode while other sections are in active mode, and cache control unit 140 may be configured to manage the power supplies of the sections and determine when to switch sections between active and retention mode.

Idle timer 142A and break-even timer 144A may correspond to section 146A, and idle timer 142B and break-even timer 144B may correspond to section 146B. When section 146A is put into active mode, idle timer 142A may be initialized and started. Idle timer 142A may continue to count as long as no requests are processed that target section 146A. If a request is received and processed for section 146A, then idle timer 142A may be initialized and re-started. When idle timer 142A rolls over (or expires), section 146B may be put into retention mode, at which point break-even timer 144A may be initialized and started. When break-even timer 144A expires, if there are any pending requests that target section 146A, then section 146A may exit retention mode and enter active mode in order to process the pending request(s). If there are multiple pending requests to section 146A, then the oldest request from the read queue (not shown) may be processed first, followed by the oldest request form the write queue (not shown). The above description of the control logic for section 146A may also apply to the control logic for section 146B and the other sections within the overall system cache.

Figure 9:
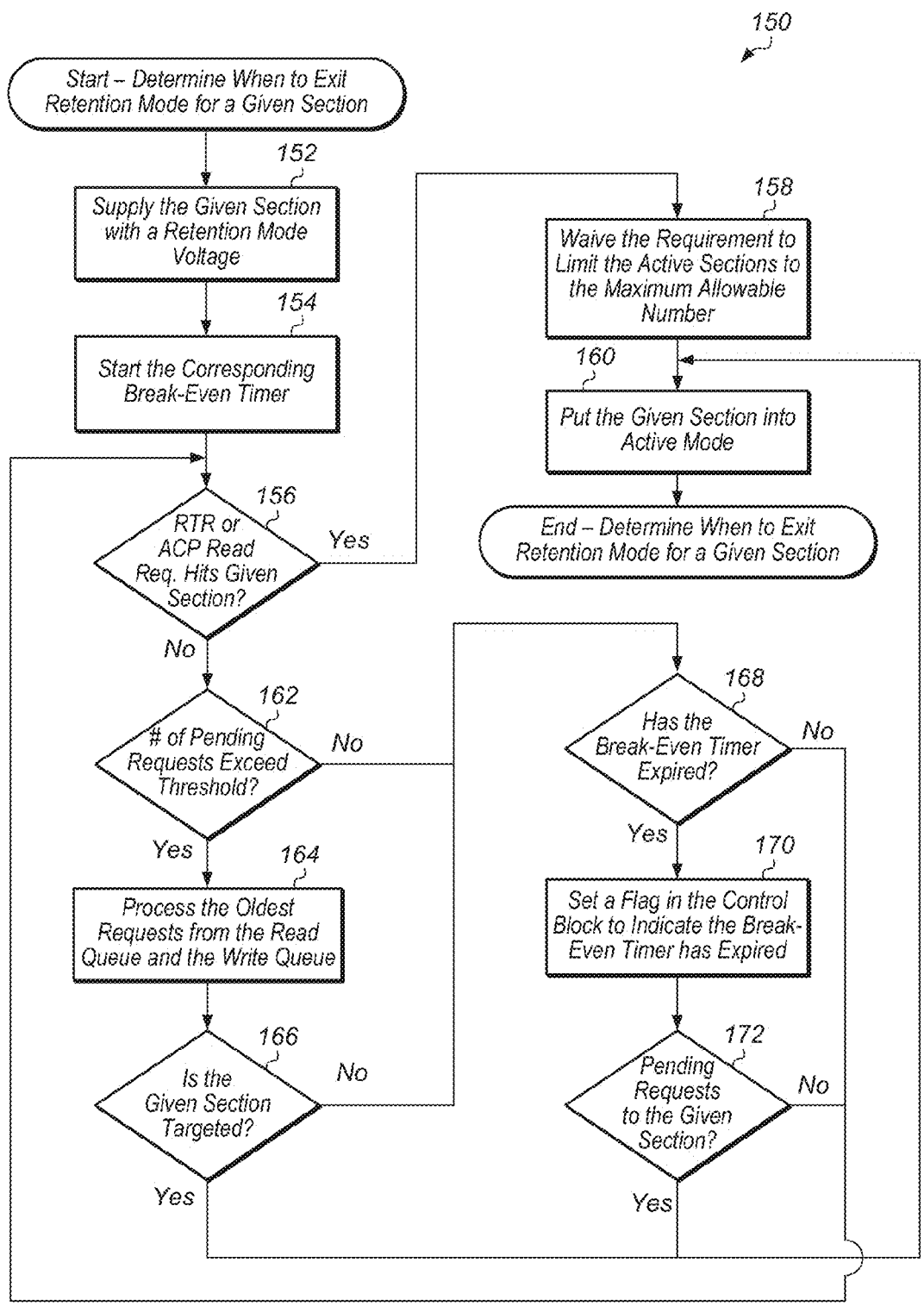
FIG. 9 is a generalized flow diagram illustrating one embodiment of a method for determining when to exit retention mode for a given section.

Referring now to FIG. 9, one embodiment of a method 150 for determining when to exit retention mode for a given section of a system cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a system cache may be divided into a plurality of sections. The number of sections used to partition the system cache may vary depending on the embodiment. For example, in one embodiment, a system cache may have a 4 megabyte (MB) capacity, and the system cache may be divided into 64 kilobyte (KB) sections. In other embodiments, the size of the system cache and sections may vary.

A separate supply voltage may be provided to power each section of the plurality of sections. In other words, each section of the system cache may have its own separately controllable power supply. Each power supply may be able to provide power at multiple separate voltages. A first voltage may be sufficient to allow the section to retain its stored data but may not be sufficient for allowing access to that particular section. The first voltage may also be referred to as a retention voltage or a retention mode voltage. A second voltage, which is higher than the first voltage, may be sufficient to allow the section to be accessed by a request that targets that particular section. The second voltage may also be referred to as an active mode voltage. Each power supply may also be configured to supply power at a third voltage, fourth voltage, etc. In some embodiments, each power supply may have a variable output, and there may be a retention mode voltage range and an active mode voltage range. For example, in one embodiment, the retention mode voltage range may be from 1.1 to 1.2 volts and the active mode voltage range may be from 1.7 to 1.8 volts. Other ranges may be employed in other embodiments. Alternatively, in some embodiments, the power supply may be configured to supply only two separate voltages (for retention mode and active mode) to each section. Generally speaking, a variety of different types of power supplies with any number of supply voltages may be utilized with the various techniques described herein.

Method 150 may begin with the given section being supplied with a retention mode voltage (block 152). Next, the cache control unit may initialize and start a corresponding break-even timer (block 154). Then, the cache control unit of the system cache may determine if a real-time red (RTR) read request or an address-conflict pushed (ACP) read request has been received and has hit in the given section of the system cache (conditional block 156). An address-conflict pushed read request refers to a read request which has an address conflict with another pending read request. As a result of the address conflict, the read request may be escalated to ensure that it is expedited by the system cache and the rest of the memory controller.

If a RTR read request or an ACP read request has been received and has hit in the given section of the system cache (conditional block 156, "yes" leg), then the cache control unit may waive the requirement to keep only a maximum allowable number of sections in active mode (block 158). Then, after block 158, the cache control unit may cause the given section to exit retention mode and to enter active mode (block 160) so as to process the RTR or ACP read request. If no RTR read requests or ACP read requests have been received that have hit in the given section of the system cache (conditional block 156, "no" leg), then the cache control unit may determine if the number of pending read queue and write queue requests exceed a software programmable threshold (conditional block 162). The number of pending read queue and write queue requests includes both requests that target active mode sections and requests that target retention mode sections. In one embodiment, the threshold may be 24, while in other embodiments, the threshold may vary.

If the number of pending read queue and write queue requests exceed the software programmable threshold (conditional block 162, "yes" leg), then the cache control unit may process one or more of the oldest requests from the read queue and write queue (block 164). In one embodiment, the cache control unit may pick the oldest request from the read queue to process followed by the oldest request from the write queue. If the number of pending read queue and write queue requests does not exceed the software programmable threshold (conditional block 162, "no" leg), then the cache control unit may determine if the break-even timer has retired (conditional block 168). Alternatively, when the break-even timer retires, a signal may be sent to alert the cache control unit, and then the cache control unit may store an indication that the break-even timer corresponding to the given section has retired.

After block 164, if any of the oldest requests being processed targets the given section (conditional block 166, "yes"

leg), then the given section may exit retention mode (block 160) so as to process the request(s). Alternatively, a request may be generated for the given section to exit retention mode in block 160, but the cache control unit may delay this request if the system cache is currently busy (i.e., a maximum allowable number of sections are already in active mode). After block 160, method 150 may end. Also, after block 160, method 180 (of FIG. 10) may be initiated for the given section. It is noted that the given section may exit retention mode in this case prior to the break-even timer expiring. If the given section is not targeted by any of the oldest requests being processed (conditional block 166, "no" leg), then the cache control unit may determine if the break-even timer has expired (conditional block 168).

If the break-even timer has expired (conditional block 168, "yes" leg), then the cache control unit may set a flag in its control block to indicate the break-even timer has expired (block 170). Then, after block 170, the cache control unit may determine if there are one or more pending requests to the given section (conditional block 172). If the break-even timer has not yet retired (conditional block 168, "no" leg), then method 150 may return to block 156 and determine if a RTR read request or an ACP read request has been received and has hit in the given section of the system cache.

If there are one or more pending requests to the given section (conditional block 172, "yes" leg), then the cache control unit may take the given section out of retention mode (block 160) so as to process the request(s). If there are no pending requests to the given section (conditional block 172, "no" leg), then method 150 may return to block 156 and determine if a RTR read request or an ACP read request has been received and has hit in the given section of the system cache. It is noted that method 150 may be performed in parallel for any number of sections of the system cache that are in retention mode.

Figure 10:
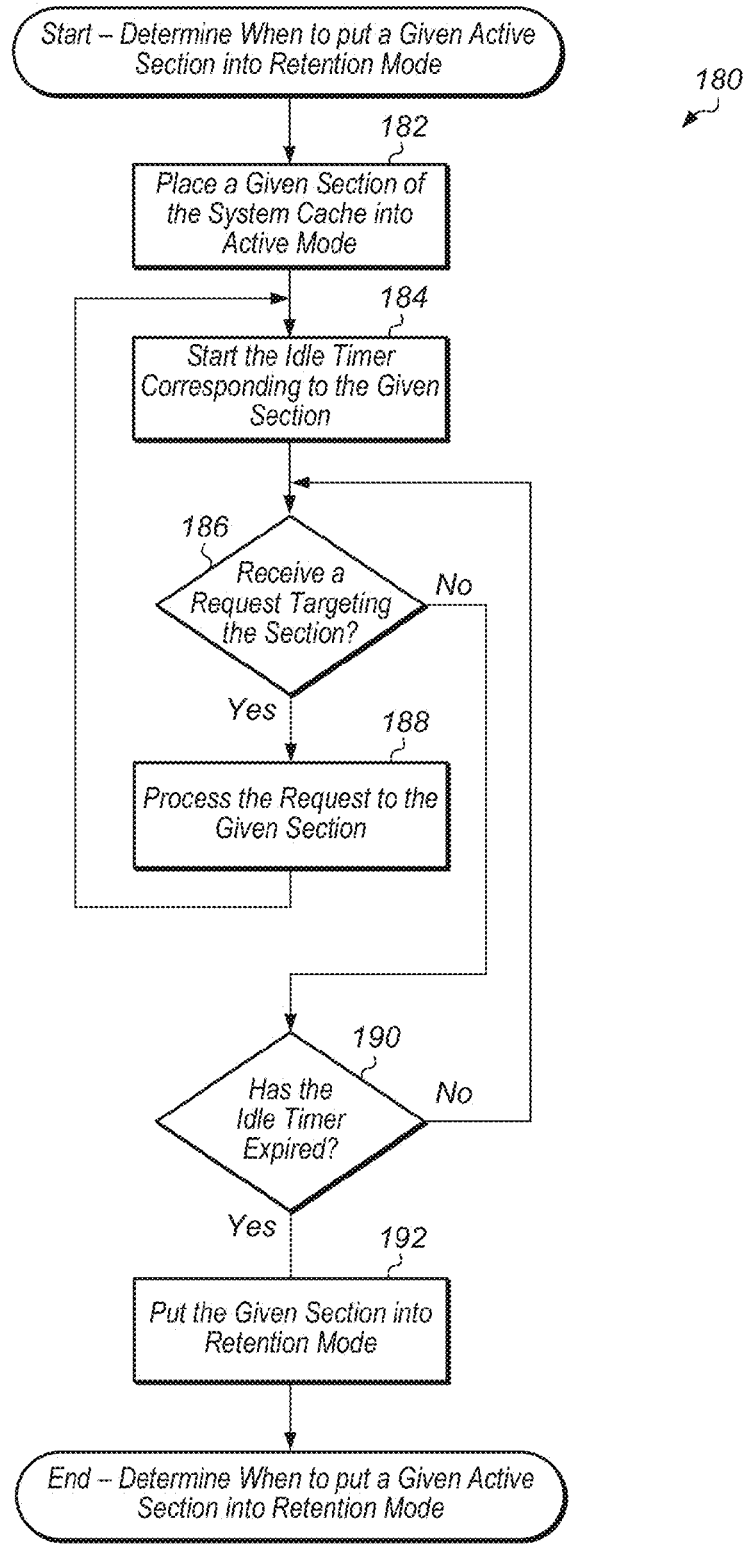
FIG. 10 is a generalized flow diagram illustrating one embodiment of a method for determining when to enter retention mode for a given section in active mode.

Turning now to FIG. 10, one embodiment of a method 180 for determining when to put a given active section of the system cache into retention mode is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a given section of a system cache may be in active mode (block 182). Then, the cache control unit may start the corresponding idle timer of the given section (block 184). While the given section is in active mode and the idle timer is running, the cache control unit may monitor the incoming requests to determine if any of the requests have been received which target the given section (conditional block 186). If a request is received targeting the given section (conditional block 186, "yes" leg), then the cache control unit may process the request(s) (block 188). After block 188, method 180 may return to block 184 to initialize and restart the idle timer.

If no requests targeting the given section are received (conditional block 186, "no" leg), then the cache control unit may determine if the corresponding idle timer has expired (conditional block 190). Alternatively, the cache control unit may wait until it receives an indication that the idle timer has expired, rather than actively polling or checking the idle timer. If the idle timer has expired (conditional block 190, "yes" leg), then the given section may be put into retention mode (block 192). After block 192, method 180 may end. Also, after block 192, method 150 (of FIG. 9) may be initiated for the given section. If the idle timer corresponding to the given section has not expired (conditional block 190, "no" leg), then method 180 may return to conditional block 186 to determine if any requests have been received which target the given section. It is noted that method 180 may be performed in parallel for any number of active sections of the system cache.

Figure 11:
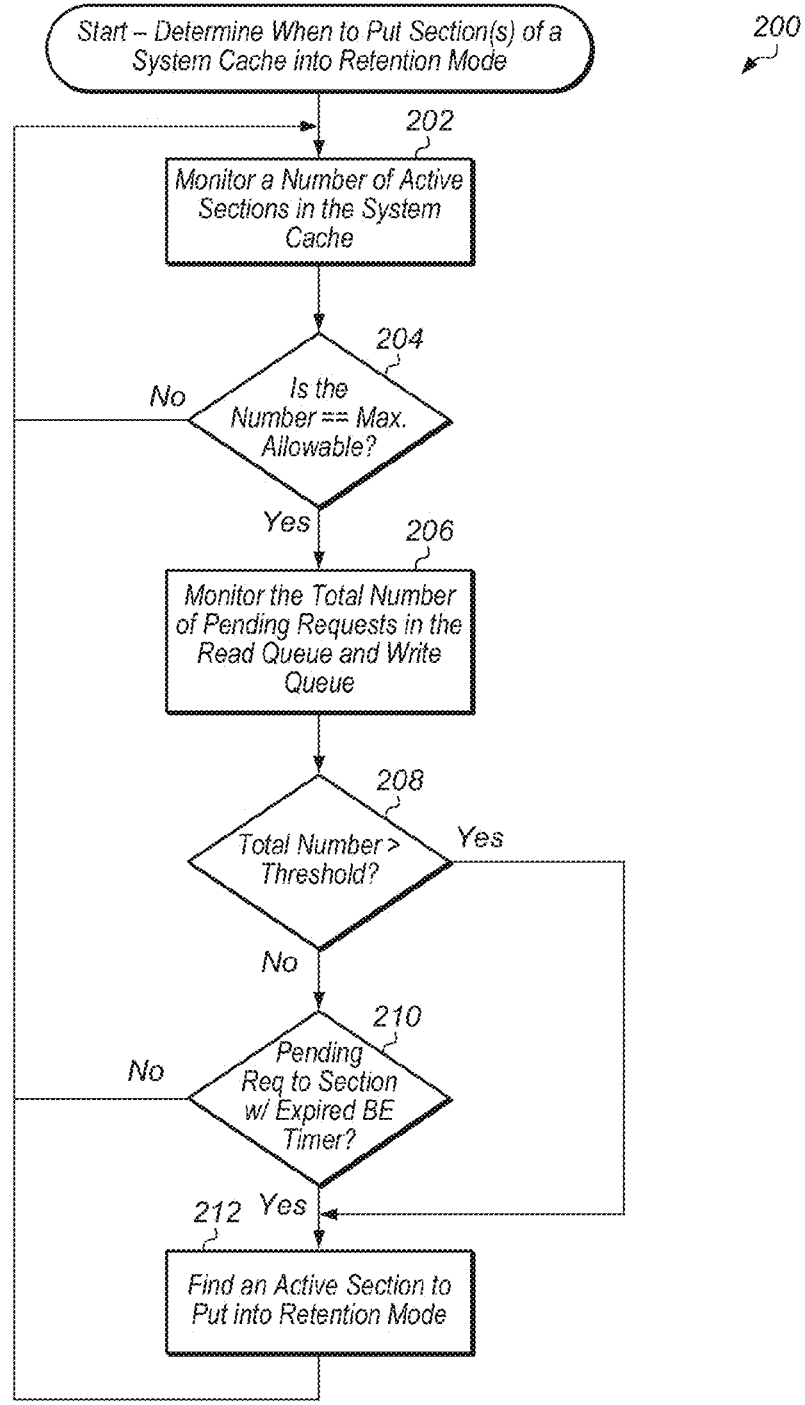
FIG. 11 is a generalized flow diagram illustrating one embodiment of a method for determining when to enter retention mode for the sections of the system cache.

Referring now to FIG. 11, one embodiment of a method 200 for determining when to put sections of a system cache into retention mode is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

Method 200 may begin with the cache control unit of the system cache monitoring the number of sections which are active (block 202). In one embodiment, the system cache may limit the number of sections in active mode to a maximum allowable number of sections. The remainder of the sections may be kept in retention mode. The maximum number of sections that are allowed to be active at any given time may be a value that is stored in a software-configurable register. Software may set this value and may change this value from time to time. In one scenario, there may be 16 ways and 8 sections per way, for a total of 108 sections. In one embodiment for this particular scenario, the register may be set to a value of 4, which would limit the number of sections that are allowed to be in active mode to 4. The total number of sections that would be in retention mode in this scenario would be at least 104. In other embodiments, the maximum allowable number of sections value may be other values besides 4. Also, in some embodiments, the system cache may have multiple channels, and the maximum allowable number of sections may apply to each channel of the system cache.

After block 202, the cache control unit may determine if the number of currently active sections is equal to the maximum allowable number (conditional block 204). It may be assumed for the purposes of this discussion that the number of currently active sections will not be greater than the maximum allowable number. However, if in some cases the number of currently active sections does exceed the maximum allowable number (e.g., if the requirement is waived in certain scenarios with a busy system cache), then conditional block 204 may be modified to determine if the number of currently active sections is greater than or equal to the maximum allowable number.

If it is determined that the number of currently active sections is equal to the maximum allowable number (conditional block 204, "yes" leg), then the cache control unit may monitor the total number of pending requests in both the read queue and write queue (block 206). In some embodiments, the cache control unit may constantly monitor the total number of pending requests in the read queue and write queue and may not wait until the number of currently active sections is equal to the maximum allowable number. When the number of currently active sections is equal to the maximum allowable number, this indicates that the system cache is currently (or has recently been) in a busy state. If it is determined that the number of currently active sections is less than the maximum allowable number (conditional block 204, "no" leg), then method 200 may return to block 202 to monitor the number of active sections in the system cache.

If the total number of pending requests in the read queue and write queue is above a software-programmable threshold (conditional block 208, "yes" leg), then the cache control unit may find an active section to put into retention mode (block 212). The determination of which active section to put into retention mode may be based on a variety of factors, including the status of the section's idle timer, the presence of any pending requests to the active section, the number of requests processed by the section over a recent period of time, etc. If the total number of pending requests in the read queue and write queue is below the software-programmable threshold (conditional block 208, "no" leg), then the cache control unit may determine if there are any pending requests which target a section in retention mode with an expired break-even timer (conditional block 210).

If the cache control unit determines there is a pending request to a section in retention mode with an expired break-even timer (conditional block 210, "yes" leg), then the cache control unit may find an active section to put into retention mode (block 212). If the cache control unit determines there are no pending requests to a section in retention mode with an expired break-even timer (conditional block 210, "no" leg), then method 200 may return to block 202 to monitor the number of active sections in the system cache.

It is noted that in some embodiments, conditional blocks 208 and 212 may be performed in a different order than that shown in method 200, or alternatively, conditional blocks 208 and 212 may be performed simultaneously. Furthermore, one or more other conditional blocks not shown may also be performed. These other conditional blocks may be other checks on the busy status of the system cache using various other metrics. It is also noted that method 200 may be performed in parallel (for the system cache as a whole) with multiple instances of method 150 and 180 (for individual sections of the system cache).

Figure 12:
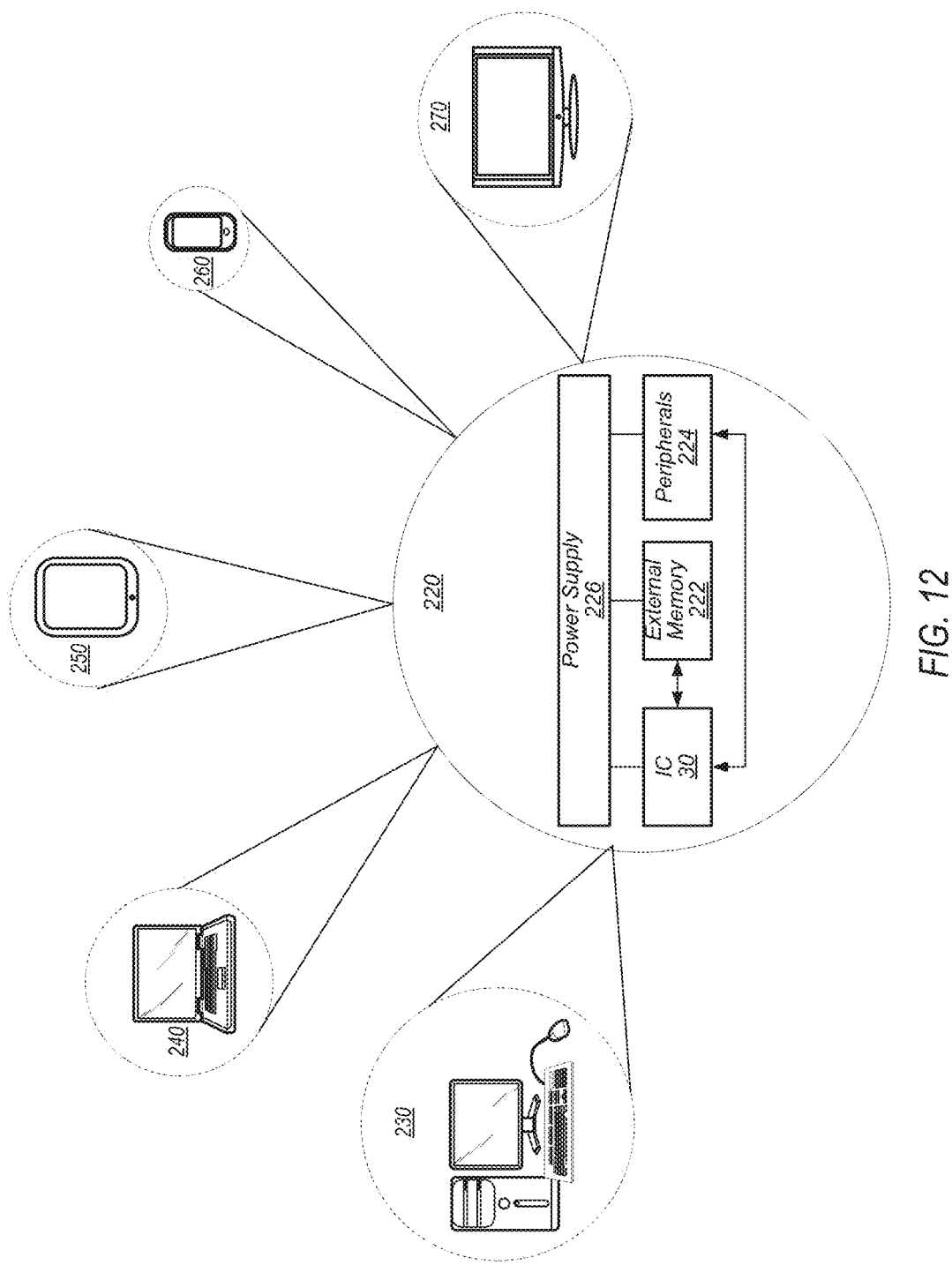
FIG. 12 is a block diagram of one embodiment of a system.

Referring next to FIG. 12, a block diagram of one embodiment of a system 220 is shown. As shown, system 220 may represent chip, circuitry, components, etc., of a desktop computer 230, laptop computer 240, tablet computer 250, cell phone 260, television 270 (or set top box configured to be coupled to a television), or otherwise. Other devices are possible and are contemplated. In the illustrated embodiment, the system 220 includes at least one instance of IC 30 (of FIG. 2) coupled to an external memory 222.

IC 30 is coupled to one or more peripherals 224 and the external memory 222. A power supply 226 is also provided which supplies the supply voltages to IC 30 as well as one or more supply voltages to the memory 222 and/or the peripherals 224. In various embodiments, power supply 226 may represent a battery (e.g., a rechargeable battery in a smart phone, laptop or tablet computer). In some embodiments, more than one instance of IC 30 may be included (and more than one external memory 222 may be included as well).

The memory 222 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 30 in a chip-on-chip configuration, a package-on-package configuration, or a multi-chip module configuration.

The peripherals 224 may include any desired circuitry, depending on the type of system 220. For example, in one embodiment, peripherals 224 may include devices for various types of wireless communication, such as wifi, Bluetooth, cellular, global positioning system, etc. The peripherals 224 may also include additional storage, including RAM storage, solid state storage, or disk storage. The peripherals 224 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A cache comprising:
  a cache memory comprising a plurality of sections, wherein each section of the plurality of sections has a separately controllable power supply, wherein each power supply is configured to provide at least a first voltage and a second voltage, wherein the first voltage is sufficient for a section to retain its stored data, wherein the second voltage is sufficient for a request to access the section, and wherein the second voltage is higher than the first voltage; and
  a cache control unit, wherein the cache control unit is configured to:
    limit a number of sections supplied with the second voltage to be less than or equal to a first threshold;
    for each section, utilize a corresponding idle timer to count a number of consecutive clock cycles during which the section is supplied with the second voltage and is not accessed by any requests; and
    cause a section to be supplied with the first voltage when an idle timer corresponding to the section expires.

2. The cache as recited in claim 1, wherein the cache control unit is further configured to cause a first section currently supplied with the second voltage to be supplied with the first voltage responsive to detecting the number of sections supplied with the second voltage is equal to the first threshold and a break-even timer of a second section currently supplied with the first voltage has expired and there is a pending request to the second section, wherein the break-even timer is initialized and started responsive to an idle timer corresponding to the second section expires.

3. The cache as recited in claim 1, wherein the cache further comprises a read queue and a write queue, and wherein the cache control unit is further configured to cause a first section currently supplied with the second voltage to be supplied with the first voltage responsive to detecting the number of sections supplied with the second voltage is equal to the first threshold and a total number of pending read queue and write queue requests is greater than a second threshold.

4. The cache as recited in claim 1, wherein the cache control unit is configured to cause a given section to be supplied with the second voltage responsive to determining there is a pending real-time red (RTR) read request that targets the given section.

5. The cache as recited in claim 1, wherein the cache control unit is configured to cause a given section to be supplied with the second voltage responsive to determining there is a pending address-conflict pushed read request that targets the given section.

6. The cache as recited in claim 3, wherein the cache control unit is configured to cause a given section to be supplied with the second voltage responsive to determining a break-even timer corresponding to the given section has expired and there is a pending request that targets the given section.

7. The cache as recited in claim 6, wherein the cache control unit is configured to select an oldest request from the read queue responsive to determining the break-even timer corresponding to the given section has expired and there is a pending request that targets the given section.

8. A method comprising:

dividing a system cache into a plurality of sections;

providing one of two supply voltages to each section of the plurality of sections, wherein the two supply voltages include a first voltage and a second voltage, and wherein the second voltage is higher than the first voltage; and limiting a number of sections that are supplied with the second voltage to a threshold number of sections;

utilizing an idle counter per section to keep track of an amount of time a respective section has been idle while being supplied with the second voltage; and causing a section to be supplied with the first voltage when an idle timer corresponding to the section expires.

9. The method as recited in claim 8, further comprising supplying with the first voltage a first section currently supplied with the second voltage responsive to detecting the number of sections supplied with the second voltage is equal to the first threshold and a break-even timer of a second section currently supplied with the first voltage has expired and there is a pending request to the second section, wherein the break-even timer is initialized and started responsive to an idle timer corresponding to the second section expires.

10. The method as recited in claim 8, wherein the system cache comprises a plurality of ways, and wherein each way is divided into a plurality of sections.

11. The method as recited in claim 8, wherein the first voltage is sufficient for data retention but not for providing data access, and wherein the second voltage is sufficient for providing data access.

12. The method as recited in claim 8, wherein the system cache comprises a read queue and a write queue, wherein the method further comprising tracking a total number of pending read queue and write queue requests in the system cache.

13. The method as recited in claim 12, further comprising changing a supply voltage of a first section from the first voltage to the second voltage responsive to detecting a total number of pending read queue and write queue requests exceeds a programmable threshold number of requests.

14. The method as recited in claim 13, further comprising picking an oldest request from the read queue followed by an oldest request from the write queue responsive to changing the supply voltage of the first section from the first voltage to the second voltage.

15. A memory controller comprising a system cache, wherein the system cache comprises:

a data memory configured to store a plurality of cache lines, wherein the data memory is divided into a plurality of sections, and wherein each section has a separate power supply;

a tag memory configured to store a plurality of tags corresponding to the plurality of cache lines in the plurality of sections; and a control unit configured to:

cause one or more sections to be supplied with a first voltage, wherein the first voltage is sufficient for data retention but not for data access;

cause one or more sections to be supplied with a second voltage, wherein the second voltage is sufficient for accessing data;

limit a number of sections supplied with the second voltage to a programmable threshold number start a first idle timer corresponding to a first section responsive to the first section being supplied with the second voltage, wherein the first idle timer counts a number of consecutive clock cycles during which no accesses are made to the first section; and supply the first section with the first voltage responsive to determining the first idle timer has expired.

16. The memory controller as recited in claim 15, wherein the control unit is further configured to cause a first section currently supplied with the second voltage to be supplied with the first voltage responsive to detecting the number of sections supplied with the second voltage is equal to the first threshold and a break-even timer of a second section currently supplied with the first voltage has expired and there is a pending request to the second section, wherein the break-even timer is initialized and started responsive to an idle timer corresponding to the second section expires.

17. The memory controller as recited in claim 15, wherein the control unit is further configured to cause a first section currently supplied with the second voltage to be supplied with the first voltage responsive to detecting the number of sections supplied with the second voltage is equal to the first threshold and a total number of pending read queue and write queue requests is greater than a second threshold.

18. The memory controller as recited in claim 15, wherein the control unit is further configured to start a first break-even timer corresponding to the first section responsive to supplying the first section with the first voltage, wherein the first break-even timer counts a number of clock cycles that the first section is supplied with the first voltage.

19. The memory controller as recited in claim 18, wherein the control unit is further configured to determine if there are any pending requests to the first section responsive to determining the first break-even timer has expired.

20. The memory controller as recited in claim 15, wherein the data memory is a static random-access memory (SRAM).

* * * * *